United States Patent

[11] 3,622,684

| [72] | Inventor | Paul R. Press<br>Whittier, Calif. |
|---|---|---|
| [21] | Appl. No. | 81,014 |
| [22] | Filed | Oct. 15, 1970 |
| [45] | Patented | Nov. 23, 1971 |
| [73] | Assignee | C. W. Cole & Co. Inc.<br>El Monte, Calif. |

[54] ROTATABLE FLOOR RECEPTACLE MOUNTING UNIT
9 Claims, 10 Drawing Figs.

[52] U.S. Cl................................................... 174/48, 339/34
[51] Int. Cl............................................................ H02g 3/08
[50] Field of Search........................................... 174/48, 49, 53, 57; 220/3.2, 3.3, 3.4, 3.5, 3.6, 3.7; 339/34

[56] References Cited
UNITED STATES PATENTS

| 2,811,574 | 10/1957 | Guerrero...................... | 174/57 |
| 2,811,575 | 10/1957 | Guerrero...................... | 174/57 |
| 3,189,862 | 6/1965 | Vleerick et al. .............. | 174/48 X |
| 3,318,476 | 5/1967 | Clark.......................... | 174/57 X |
| 3,433,886 | 3/1969 | Myers.......................... | 174/57 |

Primary Examiner—Lewis H. Myers
Assistant Examiner—D. A. Tone
Attorney—John T. Matlago ABSTRACT: A rotatable floor receptacle mounting unit is provided that includes an electrical receptacle mount that is pivotally supported within an opening in a mounting ring so that electrical receptacles thereon can be rotated to either an exposed position or a concealed position in a recess in the floor. An adjustable seal ring is coupled to form the upper annular surface of the mounting ring. When the seal ring is fastened to the mounting ring flush with the level of the floor, the inner peripheral surface thereof overlaps an annular shoulder formed on the periphery of the mount to enable a sealing gasket to be compressingly engaged therebetween. When it is desired to flip over the receptacle mount the seal ring is released and raised to provide sufficient clearance for enabling the mount to be swung on its pivotal support past the inner peripheral surface of the seal ring. The seal ring is then again lowered and fastened flush with the level of the floor to seal the mount in its new position.

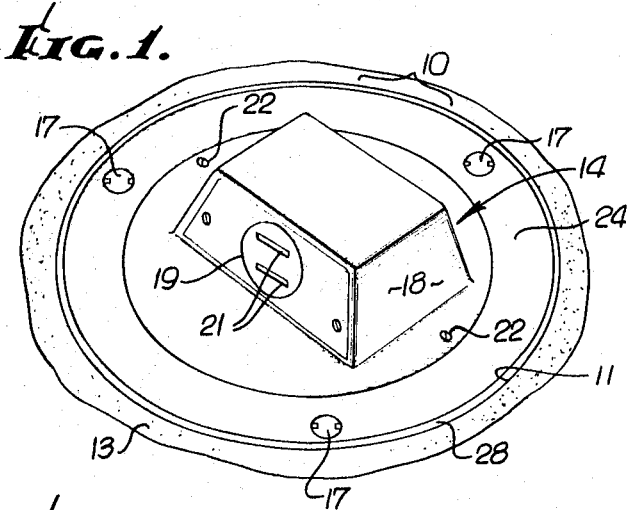
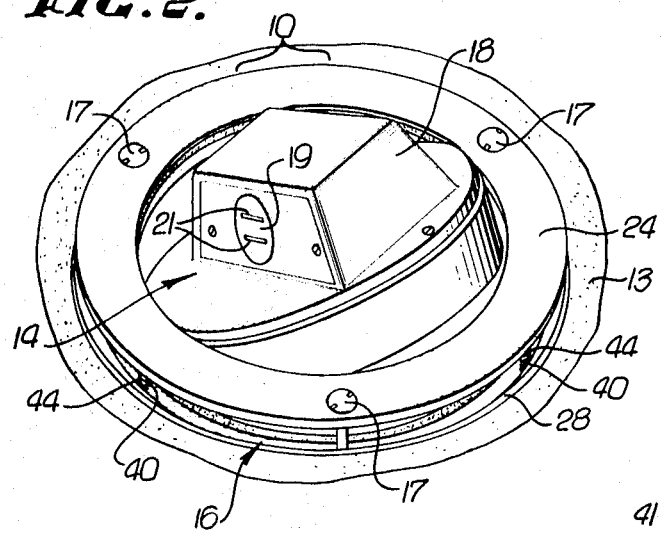
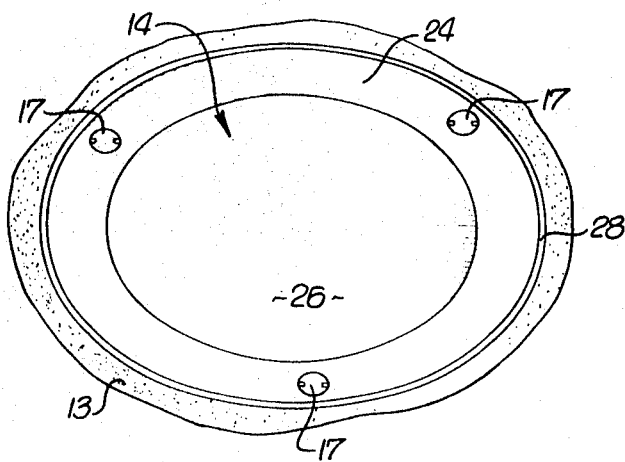
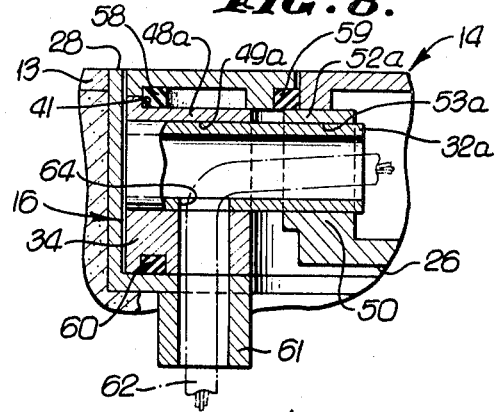
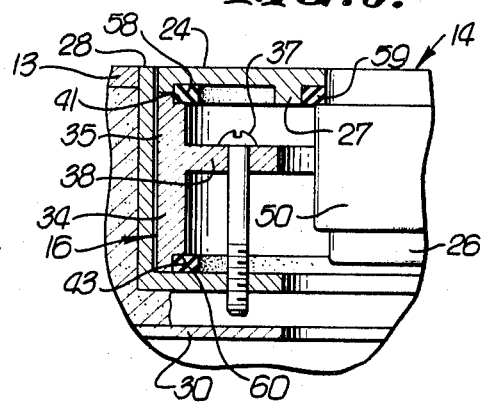
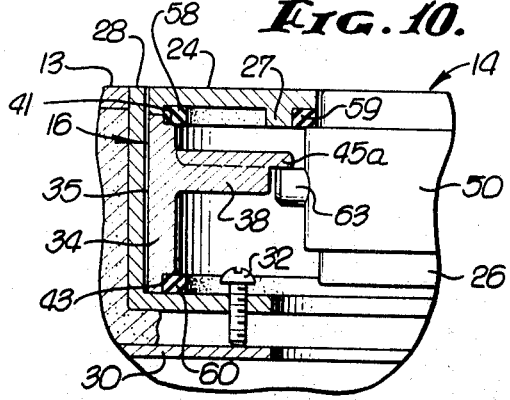
INVENTOR.
PAUL R. PRESS
BY John J. Matlago
ATTORNEY.

INVENTOR.
PAUL R. PRESS
BY John J. Maclago
ATTORNEY.

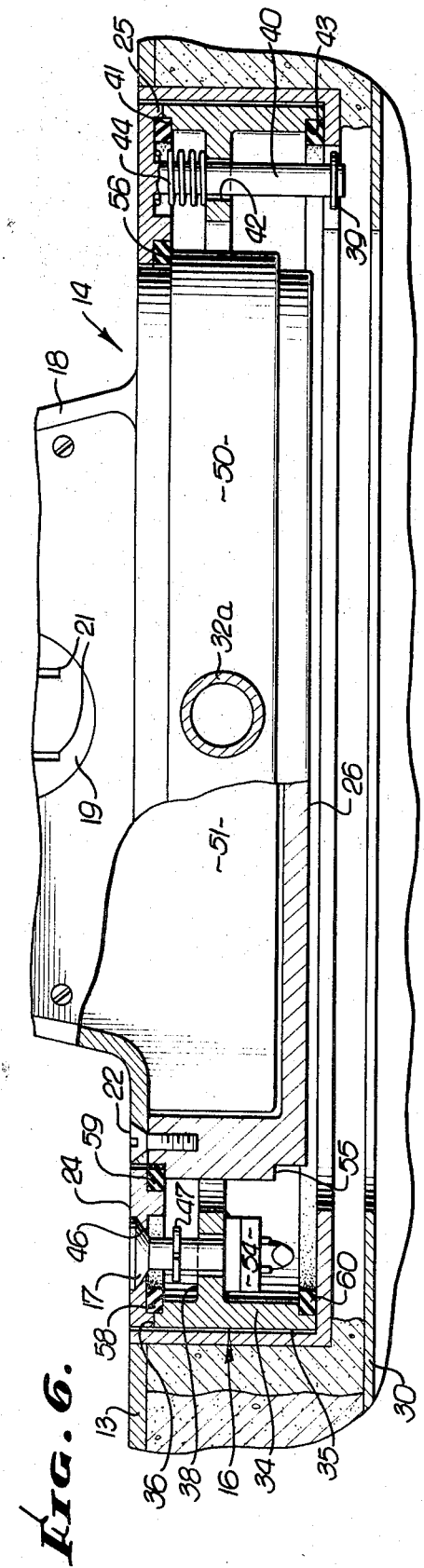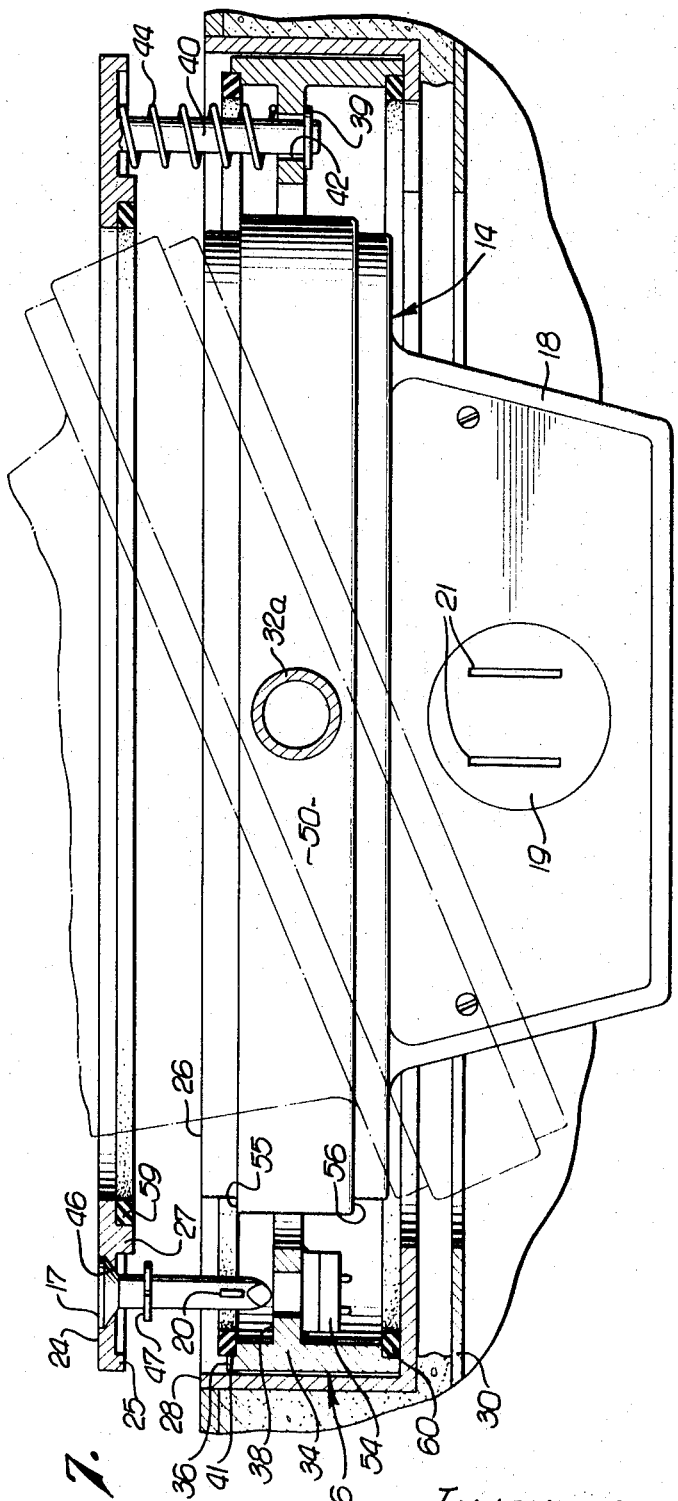

ROTATABLE FLOOR RECEPTACLE MOUNTING UNIT

This invention relates to rotatable floor receptacle mounting units and more particularly to structural arrangements for sealing an electrical receptacle mount that is pivotally supported for rotating within an opening in a mounting ring.

It is highly desirable to provide a floor receptacle mounting unit in which a mount for electrical receptacles is pivotally supported in an opening in the floor of a room so that by rotating the mount into an up position the receptacles are exposed for use above the floor and by rotating the mount into a down position the receptacles are conceled in the floor with the opening in the floor covered flush with the surrounding area so as to present a pleasing and attractive appearance.

When such a mount for electrical receptacles is pivotally supported for rotating within an opening in a mounting ring whose upper surface is fixed flush with the level of the floor, there is necessarily a gap between the mount and the opening to enable the mount to be swung about its pivotal support from one position to the other. Accordingly, it is impractical with such a structural arrangement to tightly seal the mount within the opening in the mounting ring so as to make the mounting unit thoroughly watertight. This presents a problem since if provision is not made for sealing the mount an electrical hazard is presented when the floors are scrubbed, for example.

The present invention provides for sealing a rotatable floor receptacle mount in its mounting ring by making the upper annular surface of the mounting ring an adjustable seal ring. The seal ring is adjustable from a lowered position in which it is flush with the level of the floor to a raised position above the level of the floor. The seal ring is held in its lowered position by fasteners which when released permit springs on the undersurface of the seal ring to force it to its raised position. When the seal ring is held in its lowered position flush with the level of the floor, the inner peripheral surface thereof overlaps a countersunk portion formed on the periphery of the mount to enable a sealing gasket to be compressingly engaged therebetween. When it is desired to flip over the receptacle mount from one position to the other within the mounting ring, the fasteners holding the seal ring in its lowered position are released such that the springs on the undersurface thereof force it to move to its raised position, thus providing a sufficient clearance for enabling the mount to be swung on its pivotal support past the inner peripheral surface of the seal ring such that the opposite surface of the mount is in an up position. Pressing down on the seal ring and using fasteners to latch it in position flush with the level of the floor then provides for again engaging the sealing gasket interposed between the overlapping peripheral surfaces of the seal ring and the mount.

Accordingly the principal object of the invention is to provide a simple, effective means for tightly sealing a rotatable floor receptacle mount within a mounting ring in which it is pivotally supported.

Another object of the invention is to provide for sealing a rotatable floor receptacle mount that is pivotally supported within a mounting ring by using an adjustable seal ring to form the upper annular surface of the mounting ring.

Another object of the present invention is to provide for simply releasing and raising a seal ring forming the upper annular surface of a mounting ring so that a rotatable electrical receptacle mount pivotally supported therein can be flipped over to its opposite position and then sealed by lowering and fastening the seal ring.

These and other objects, advantages and features of the present invention will be made apparent from the following description in conjunction with the accompanying drawings, in which:

FIG. 1 is a view of a rotatable floor receptacle mounting unit showing a rotatable mount in position with an electrical receptacle thereon exposed for use above the floor;

FIG. 2 is a view of the mounting unit with its seal ring raised such that the mount can be rotated within the mounting ring;

FIG. 3 is a view of the mounting unit showing the rotatable mount in position with the electrical receptacle thereon concealed below the level of the floor;

FIG. 6 is a partially sectional view of the mounting unit as taken along lines 6—6 of FIG. 4;

FIG. 7 is a partially sectional view of the mounting unit showing the seal ring in its raised position and the mount being rotated on its pivotal support within the mounting ring;

FIG. 8 is a detail of the mounting unit taken along lines 8—8 of FIG. 4 showing the pivotal support for the mount in the mounting ring;

FIG. 9 is a detail showing how the mounting ring is secured within the casing taken along lines 9—9 of FIG. 4; and FIG. 10 is a detail of the mounting unit taken along lines 10—10 of FIG. 4 showing the stop for limiting the rotational movement of the mount within the mounting ring.

Figure 4:
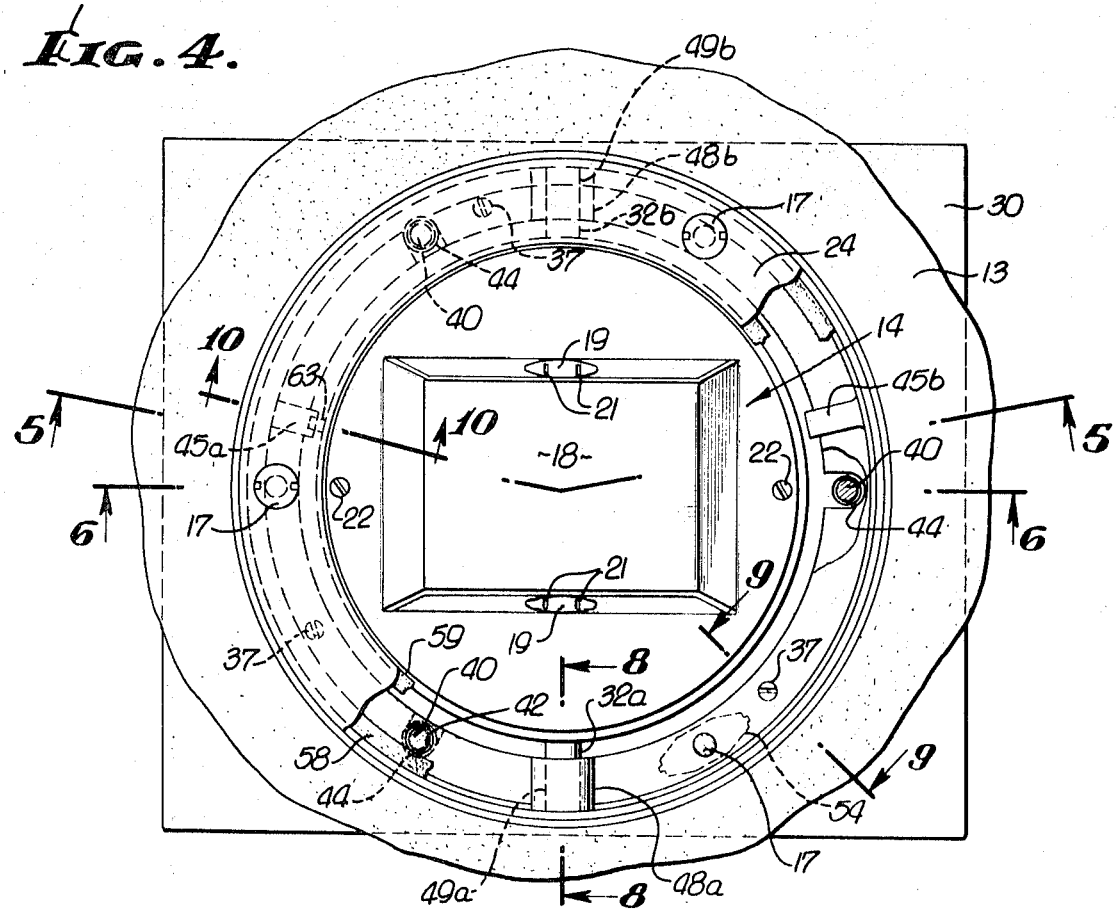
FIG. 4 is a top plan view of the mounting unit in FIG. 1 with a portion of the seal ring cut away to show the lower portion of the mounting ring.

Referring to FIGS. 1–3 of the drawings, a rotatable floor receptacle mounting unit 10 is shown installed in an opening 11 provided in the floor 13. The mounting unit 10 includes a disc-shaped platform or mount 14 which is pivotally supported within a mounting ring 16 (FIG. 8). An adjustable seal ring 24 is provided on the upper end of mounting ring 16. Secured on one surface of mount 14 is a housing 18 having electrical receptacles 19 attached on opposite sides thereof. Each receptacle 19 is provided with a pair of slots 21 for entrance of the blades of a plug (not shown) of an electrical device to be serviced. In FIG. 1 the mounting unit 10 is shown with seal ring 24 flush with the level of the floor and with mount 14 in its position in which receptacle 19 thereon is available for use above the floor. When the receptacles 19 need no longer be exposed to provide service, three fasteners 17 equally spaced about the seal ring 24 are rotated to release the seal ring 24 to enable springs 44 on the undersurface thereof to raise the seal ring 24 to a position above the level of the floor, as shown in FIG. 2. In accordance with the present invention, the seal ring 24 is raised in order to provide a clearance for enabling the mount 14 to be rotated 180 degrees about its pivotal supports provided on the mounting ring 16 to the position shown in FIG. 3 in which the surface of the mount 14 with the receptacles 19 thereon is in a down position in which it is concealed within the floor and the opposite flat surface of the mount 14 forming cover plate 26 is in an up position.

Figure 5:
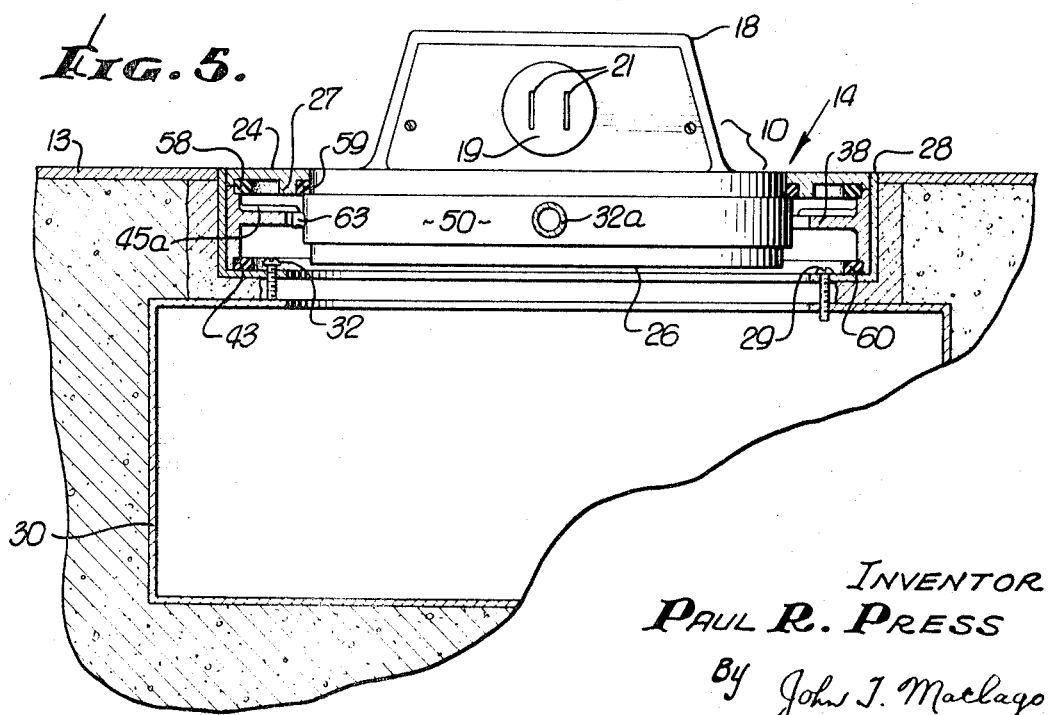
FIG. 5 is a partially sectional view of the mounting unit as taken along lines 5—5 of FIG. 4.

Reference will next be made to FIGS. 4–9 to describe the details of construction of the floor receptacle mounting unit 10. As shown in FIG. 5, the mounting unit 10 includes an outer circular casing 28 which has an L-shaped cross section. The casing 28 is positioned above a box 30 provided in the opening in the floor. The casing 28 is attached to the box 30 by two spaced screws 29, one of which is shown in FIG. 5, which pass through clearance holes provided on the bottom of the casing 28 and threadably engage tapped openings in the top of the box 30. In addition, the bottom of casing 28 is provided with three appropriately spaced leveling screws, such as screw 32 shown in FIG. 10, which threadably engage tapped openings in the bottom of the casing 28 and extend inwardly to contact the top of the box 30. These leveling screws 32 are used to accurately position the casing 28 at the proper level for the floor 13 which may have a covering such as tile or linoleum thereon. An opening in the side wall of box 30 has a conduit (not shown) extending therethrough which carries electrical wires 62 (FIG 8) from the electrical wiring source to receptacles 19.

Next to be described is the mounting ring 16 which is concentrically positioned within casing 28. Mounting ring 16, as shown in FIGS. 6 and 8, is comprised of a cast circular body 34 with the seal ring 24 releasably attached to form the upper surface thereof. Body 34 has an outer circular wall 35 provided with a recess 41 on the upper inner end thereof in which an outer annular sealing gasket 58 is securely positioned and provided with a recess 43 on the lower inner end thereof in which an annular sealing gasket 60 is securely positioned. Body 34 is further provided with an integrally formed inner flange 38. The outer circular wall 35 of body 34 has a close fit within the inside wall of the casing 28 and the lower edge thereof with the sealing gasket 60 rests on the lower inside surface of the casing 28. As shown in FIGS. 4 and 9 the mounting ring 16 is securely attached to the casing 28 by three equally spaced screws 37 which pass through clearance holes in the inner flange 38 of the body 34 and engaged tapped holes in the casing 28.

Seal ring 24 which forms the adjustable upper surface of the mounting ring 16 will next be described. Seal ring 24 is an annular plate provided on the undersurface thereof with a downwardly extending outer rim 25 and an inner shoulder 27. An inner annular sealing gasket 59 is securely attached against shoulder 27. Gasket 59, as well as gaskets 58 and 60 previously described, can be made of rubber, leather, felt or any analogous yieldable material. Seal ring 24 is integrally formed with three spaced pins 40 on the undersurface thereof as shown in FIGS. 4, 6 and 7. These pins extend through clearance openings 42 provided on the inner flange of the body 34 of mounting ring 16. A spring 44 is provided on each of the three pins 40 with the upper end of the spring contacting the undersurface of the seal ring 24 and the lower end contacting the upper surface of the inner flange 38 of body 34. A snap ring 39 is located on the lower end of each of the pins to prevent the seal ring 24 from becoming detached from the body 34 of the mounting ring 16 when the springs 44 urge the seal ring 24 into a raised position. The seal ring 24 is also provided with three angularly spaced openings 46 (FIG. 6) for the three fasteners 17. The fasteners 17 are prevented from being removed from openings 46 by snap rings 47. Locks 54 are located on the lower surface of inner flange 38 below clearance holes lined with the spaced openings 46. Each of the fasteners 17 is provided with a cleat 20 on the lower surface thereof which engages a spring loaded notched surface on the lower end of the lock 54 when the fastener 17 is rotated a quarter turn.

Continuing with the description of the mounting ring 16, as shown in FIGS. 4 and 8, bosses 48a and 48b are provided on diametrically opposed inside surfaces of the wall of the body 34. These bosses are provided with aligned bores, such as bore 49a for boss 48a (FIG. 8), whose center line corresponds to the axis of rotation of the mount 14. In addition, as shown in FIGS. 4 and 5, mounting ring 16 is provided with stopping pads 45a and 45b which are respectively located on one side of the central plane formed by rotation of the mount 14.

Next to be described is the cylindrical disc shaped mount 14 which is pivotally supported on the mounting ring 16 and constructed to cooperate with the seal ring 24 to form a watertight seal. As shown in FIGS. 5, 6 and 8, mount 14 is comprised of a cast cylindrical body 50 provided on one surface thereof with the integrally formed circular plate 26 and provided on the opposite surface thereof with receptacle housing 18, the flared circular base of which is secured to the body 50 by screws 22. As shown in FIG. 6, a vertical shield 51 is provided within the housing 18 and the cylindrical body 50 to form an electrical barrier between the receptacles 19 attached to the sides of the housing 18. Formed within cylindrical body 50 on diametrically opposed sides thereof are bosses, such as boss 52a, which bosses are provided with aligned bores, such as bore 53a, whose center line corresponds to the axis of rotation of the mount 14. The outer annular wall of mount 14 is provided with annular shoulders 55 and 56 near the respective end surfaces thereof. Shoulder 55 is formed by machining body 50 and the other shoulder 56 is formed by the machined edge of the flared circular base of housing 18 attached to body 50.

As will now be clear from the showings in FIGS. 4 and 8, upon assembling the mount 14 within the mounting ring 16, the bores in bosses 48a and 48b of the mounting ring 16 enable respective pivot tubes 32a and 32b to be inserted therethrough from the outside of the mounting ring so as to extend into the aligned bores provided in the respective bosses of the mount 14, such as boss 52a. These pivot tubes 32a and 32b have a press fit in the respective bores of bosses 48a and 48b of the mounting ring 16 and a free fit in the respective bores of the bosses such as 52a of the mount 14 to enable the mount 14 to be pivoted about these pivot tubes 32a and 32b. As shown in FIG. 8, pivot tube 32a is provided with an opening 64 on the lower surface thereof which extends down to an opening in the body 34 to a wire guide 61 attached to the underside of casing 28. This opening in the tube 32a enables the electrical wires 62 connected to receptacles 19 to extend into the box 30. It is noted that pivot tube 32a on the opposite side of the mount 14 can also be similarly adapted to have wires passed therethrough.

As shown in FIG. 10, the mount 14 has secured to the side periphery thereof a stopping pin 63 which encounters one of the stopping pads 45a or 45b on the mounting ring 16 dependent upon whether the receptacles 19 thereon are rotated to an upward or downward position. Thus, stopping pin 63 rests on the stopping pad 45a when the electrical receptacles 19 are in their operating position, as shown in FIGS. 1 and 5, and when the mount 14 is flipped over, as shown in FIG. 3, the stopping pin 63 is made to rest on the stopping pad 45b. It should be further noted that the pivot tubes 32a and 32b are located on mount 14 midway of the height of the body 50 of the mount 14 such that irrespective of the up or down position of the mount 14 its exposed adjoining surface is flush with the level of the floor.

It should now be clear from the showing in FIG. 6 that when the mount 14 is positioned in the mounting ring 16 with its receptacles 19 in an exposed position, the seal ring 24 can be positioned on the body 34 flush with the level of the floor and latched by fasteners 17 so as to compressingly engage the outer sealing gasket 58 on the upper recess 41 of the wall or body 34. In addition, the inner sealing gasket 59 on the inner shoulder 27 of seal ring 24 is compressingly engaged against the shoulder 56 of the mount 14. Then, as shown in FIG. 7, when the receptacles 19 need no longer be exposed for providing electrical service, the seal ring 24 of the mounting ring 16 is unlocked by turning fasteners 17 a quarter turn such that the seal ring 24 is released and forced upward by the springs 44 on the undersurface thereof. Raising the seal ring 24 provides sufficient clearance to enable the mount 14 to be pivoted 180 degrees such that its cover plate 26 is now exposed forming a flush plate over the opening provided in the floor. The seal ring 24 is then pressed down against springs 44 and latched by rotating the fasteners 17 a quarter turn such as to again compressingly engage the outer gasket 58 on the body 34 of the mounting ring and the inner gasket 59 on the undersurface of the seal ring 24 against the shoulder 55 of the mount 14. It should be noted that flush plate 26 is sufficiently strong so that it can be stepped upon without injury to the mounting unit 10. It should be further noted that inasmuch as the top adjoining surfaces of the mount 14 and the seal ring 24 are made flush with each other and with the surface of the floor the mounting unit provides a reliable and pleasing structure in which the receptacles 19 can be easily and quickly made accessible for use when desired, or concealed in the floor, while at the same time affording an effective water and dirt seal for the rotatable mount 14 in either of its positions.

From the above description it will be apparent that there is thus provided a device of the character described possessing the particular features of advantage before enumerated as desirable, but which obviously is susceptable of modification in its form, proportions, detailed construction and arrangement of parts without departing from the principal involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect and the invention is therefore claimed in any of its forms or modifications within the legitimate and valid scope of the appended claims.

What is claimed is:

1. A rotatable floor receptacle mounting unit comprising a mounting ring, an electrical receptacle, a mount for said electrical receptacle, said mount pivotally supported in said mounting ring so that it can be rotated to a position in which the receptacle thereon is exposed for use above the level of the floor or to a position in which the receptacle is concealed below the level of the floor, said mount having an outer peripheral surface, a seal ring forming the upper annular surface of said mounting ring, said seal ring being releasably coupled to said mounting ring such that it is either in a lowered position flush with the level of the floor or in a raised position above the level of the floor, a resilient means, said seal ring having an inner peripheral surface for compressingly engaging said resilient means against the outer peripheral surface of said mount when said seal ring is flush with the level of the floor, and means for releasing said seal ring to permit it to be moved to its raised position to enable said mount to be rotated about its pivotal support in said mounting ring from one said position to the other said position.

2. The invention in accordance with claim 1 wherein said resilient means is a sealing gasket.

3. The invention in accordance with claim 2 wherein said seal ring is provided with fasteners for fastening said seal ring to said mounting ring in said lowered position flush with the level of the floor.

4. The invention in accordance with claim 3 wherein said means for releasing said seal ring includes springs on the undersurface thereof for raising said seal ring to a raised position above the level of the floor when said fasteners are unfastened.

5. The invention in accordance with claim 4 wherein said seal ring is provided with pins on the undersurface thereof, wherein said mounting ring is provided with an inner flange having openings therein for receiving said pins, and wherein said springs are positioned on said pins so as to bear against the underside of said seal ring and the inner flange of said mounting ring.

6. The invention in accordance with claim 3 wherein said fasteners extend through openings in said seal ring to locks on the inner flange of the mounting ring, and whereby upon said seal ring being pressed down against said springs said fasteners can be rotated to lock said seal ring in the said lowered position flush with the level of the floor.

7. The invention in accordance with claim 2 including an additional sealing gasket, said additional sealing gasket being compressingly engaged between the outer lower surface of said seal ring and the upper surface of said mounting ring when said seal ring is positioned flush with the level of the floor.

8. The invention in accordance with claim 7 including an outer casing for said mounting ring, and a third sealing gasket, said mounting ring being secured to said casing to compressingly engage said third sealing gasket between the lower surface of said mounting ring and the lower inside surface of said casing.

9. The invention in accordance with claim 1 wherein said mount is in the form of a cylindrical disc with the receptacle mounted on one face thereof, and wherein the outer peripheral surface of said mount comprises an annular shoulder adjacent each of the faces of the disc, and wherein said seal ring has a central opening in which either face of said mount can be closely fitted when the seal ring is in a lowered position such that the adjoining surfaces of the seal ring and the face of the mount are flush with each other and with the level of the floor.

* * * * *